United States Patent
Chainer et al.

(10) Patent No.: US 6,633,451 B1
(45) Date of Patent: Oct. 14, 2003

(54) SELF-SERVO-WRITING TIMING PATTERN GENERATION WITH NON-OVERLAPPING READ AND WRITE ELEMENTS

(75) Inventors: Timothy J. Chainer, Putnam Valley, NY (US); Bucknell C. Webb, Ossining, NY (US); Mark D. Schultz, Elmsford, NY (US); Edward J. Yarmchuk, Somers, NY (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 09/426,435

(22) Filed: Oct. 25, 1999

Related U.S. Application Data (60) Provisional application No. 60/131,378, filed on Apr. 28, 1999.

(51) Int. Cl.[7] ............................................. G11B 21/02
(52) U.S. Cl. ........................................................ 360/75
(58) Field of Search ............................. 360/75, 51, 53, 360/3, 7, 125

(56) References Cited

U.S. PATENT DOCUMENTS

| | | | |
|---|---|---|---|
| 4,414,589 A | | 11/1983 | Oliver et al. |
| 4,531,167 A | | 7/1985 | Berger |
| 4,729,048 A | * | 3/1988 | Imakoshi et al. ..... 360/77.08 X |
| 5,010,430 A | * | 4/1991 | Yamada et al. ...... 360/77.08 X |
| 5,229,901 A | * | 7/1993 | Mallary ............... 360/77.02 X |
| 5,485,322 A | * | 1/1996 | Chainer et al. ................ 360/51 |
| 5,581,420 A | * | 12/1996 | Chainer et al. ................ 360/75 |
| 5,615,058 A | | 3/1997 | Chainer et al. |
| 6,075,668 A | * | 6/2000 | Chainer et al. ................ 360/51 |
| 6,078,450 A | | 6/2000 | Chainer et al. |
| 6,101,055 A | | 8/2000 | Chainer et al. |
| 6,373,648 B2 | * | 4/2002 | O'Connor .................... 360/63 |
| 6,429,989 B1 | * | 8/2002 | Schultz et al. ................ 360/51 |

OTHER PUBLICATIONS

U.S. patent application Ser. No. 08/882,396, filed Jul. 10, 1997, now U.S. patent No. 6,252,732.

* cited by examiner

*Primary Examiner*—David Hudspeth
*Assistant Examiner*—K. Wong
(74) *Attorney, Agent, or Firm*—Fleit, Kain, Gibbons, Gutman & Bongini, P.L.

(57) ABSTRACT

A method is provided for writing a servo-pattern on a storage medium. According to the method, first timing marks are written at a first radial position of the storage medium, and the head is moved to a second radial position. Time intervals between selected pairs of the first timing marks are measured, and other timing marks are written at the second radial position of the storage medium. The measuring step is performed after the moving step. In one preferred method, the steps of moving, measuring, and writing other timing marks are repeated until the servo-pattern is written on an entire surface of the storage medium. A method is also provided for generating an initial aligned pattern of timing marks for self-servo-writing on a storage medium.

27 Claims, 10 Drawing Sheets

SELF-SERVO-WRITING TIMING PATTERN GENERATION WITH NON-OVERLAPPING READ AND WRITE ELEMENTS

CROSS-REFERENCE TO RELATED APPLICATIONS

This application is based upon and claims priority from prior U.S. Provisional Application No. 60/131,378, filed Apr. 28, 1999, the entire disclosure of which is herein incorporated by reference.

BACKGROUND OF THE INVENTION

1. Field of the Invention

The present invention relates to computer systems, and more specifically to a method and apparatus for writing servo-track information on a disk drive with non-overlapping read and write elements.

2. Description of Related Art

Information for electronic systems such as computer and data processing systems is typically stored on storage media such as magnetic disk drives. Recently, increased storage capacity in floppy and hard disk drives has been achieved by using higher track densities that are made possible by the use of voice-coil and other types of servo-positioners and technologies such as magneto-resistive head technology that allow narrower tracks to be read and written. While conventional low density disk drives achieved satisfactory head positioning with leadscrew and stepper motor mechanisms, the higher track densities currently being used make the mechanical error of such a motor mechanism so great as to become significant compared to the track-to-track spacing. Thus, high density drives require an embedded servo that can read servo-patterns from the disk and determine the position of the head.

Conventional servo-patterns (or servo-data tracks) generally take the form of short bursts of a constant frequency signal that are very precisely located. More specifically, it is critical that the head follow the center line of a data track during both reading and writing. Thus, servo-data is typically written on both sides of the data track so as to be offset from the center line of the data track. Further, the servo-data is generally dispersed around the data track by writing short bursts in each of the sixty or so sector header areas of the data track. Such data bursts can be used by the embedded servo mechanism to find the center line of the data track. This allows the head to follow the track center line around the disk even when the track is out of round (e.g., due to spindle wobble, disk slip, or thermal expansion). As the size of disk drives is reduced and track density is increased, the servo-data must be more accurately located on the disk.

Figures 1A, 1B:
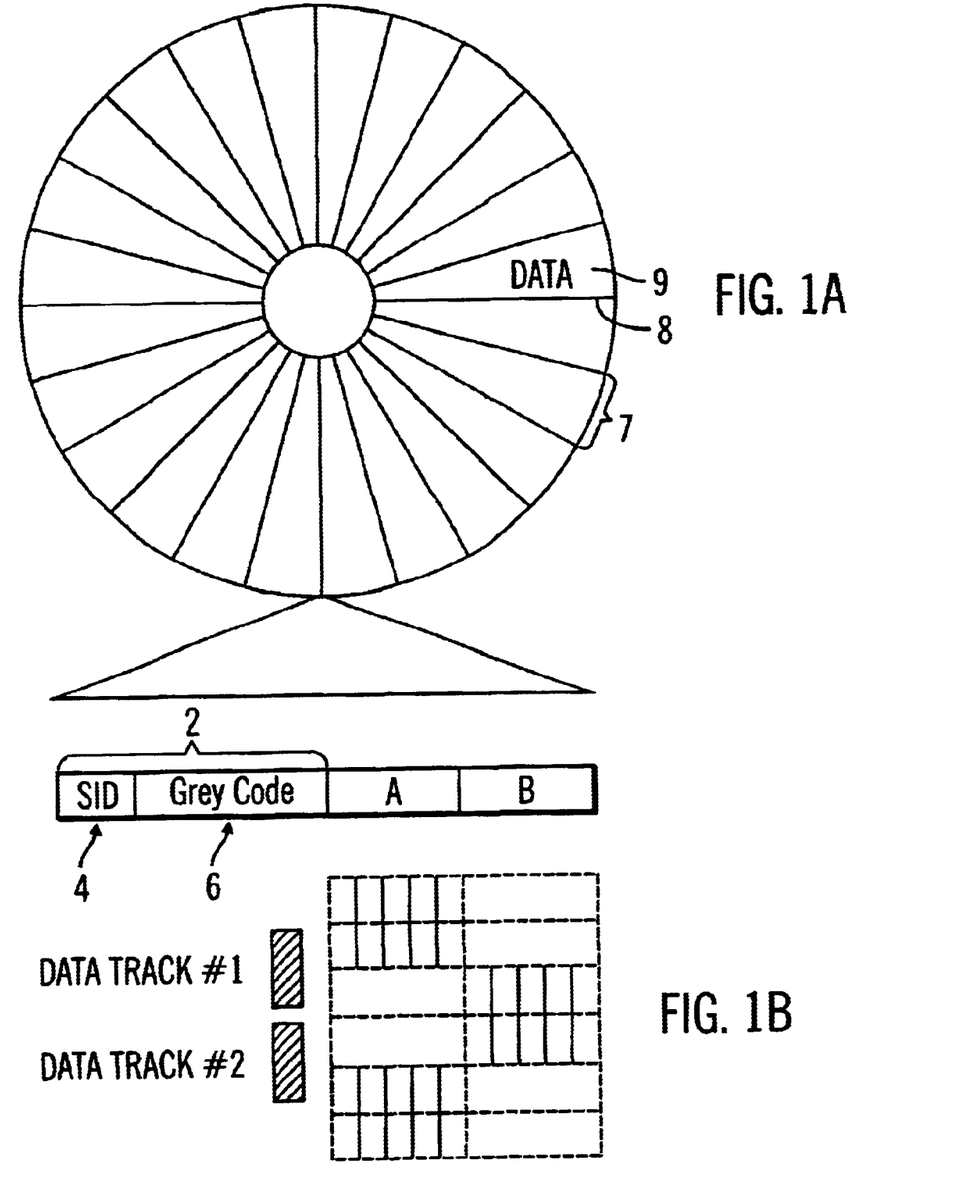
FIGS. 1(a) and 1(b) show a conventional servo-data pattern on a disk.

FIGS. 1(a) and 1(b) show a conventional servo-data pattern on a disk. As shown, circular data tracks are broken into sectors 7 that each have a sector header area 7 followed by a data area 9. Each sector header area 8 includes sector header information 2 followed by a servo-data area that provides radial position information. The sector header information 2 includes a servo-identification (SID) field 4 and a grey code field 6 that must be precisely aligned from track to track to prevent destructive interference in the magnetic pattern. Such interference can reduce the amplitude of the signal and cause data errors.

During conventional drive manufacturing, the disk drive is typically mounted in a mastering station that is known as a servo-writer. The servo-writer has sensors that are positioned outside of the disk drive to locate the radial and circumferential position of at least one of the drive's internal heads. Using information from the sensors, the servo-writer causes the head to write a pattern of magnetic information (i.e., servo-data) onto the disk. As explained above, the servo-pattern becomes the master reference used by the disk drive during normal operation to locate the tracks and sectors for data storage. When such a station is used to perform the servo-writing, manufacturing expenses increase because each disk drive must be mounted in the servo-writer. Additionally, the mechanical boundary conditions of the disk are altered because the external sensors must have access to the actuator and the disk spindle motor. Thus, mechanical clamping and disassembly of the drive may also be required.

One conventional servo-writing process is disclosed in U.S. Pat. No. 4,414,589. In the disclosed process, a servo-track following system is used to position a moving read/write head relative to a magnetic storage disk. A plurality of servo-data tracks are recorded in sectors of the disk to identify radial positions or data tracks. In particular, a clock track is written by writing a single pulse on a fixed clock track head, phase-lock looping to an intermediate clock track that is written by a moving head, and then phase-lock looping up to the final clock track that is written on the fixed clock track head.

Radial track density is then determined by moving a head to a limit stop and writing a reference track. Next, the head is displaced an amount sufficient to reduce the amplitude of the reference track by a predetermined percentage that is related to the ultimate average track density, and another reference track is written. The head is then again displaced from the second reference track to again reduce the amplitude of the reference track by a predetermined percentage. This is repeated until the disk is filled with reference tracks. If the final average track density is unsatisfactory, the percentage is adjusted and the process is repeated.

Another conventional servo-writing process is disclosed in U.S. Pat. No. 4,531,167. According to this process, a master clock track is first written on the disk by a separate head to serve as a timing reference for the entire servo-track writing operation. After writing the master clock track, "even" servo-data bursts are written over the entire surface of the disk by first moving the arm to the outer crash stop and then radially moving the arm a distance that is less than a data track width for each revolution of the disk.

After reaching the inner diameter of the disk, the arm is once again moved to the outer crash stop and then radially moved for each revolution of the disk to write "odd" servo-data bursts are written. After servo-writing is completed, the number of steps of the arm from the outer crash stop to the inner crash stop is compared with the desired number of tracks. If the number of steps is different from the desired number of tracks, a bias is introduced and the process is repeated so that the number of steps will equal the desired number of tracks.

Such conventional servo-writing procedures require the use of an external timing sensor in order to write the timing patterns that are used to determine the circumferential head position. Because external sensors are needed, the servo-writing must be performed in a clean room environment. Additionally, an external clock source and auxiliary clock heads are required to write the timing information. Further, in such procedures, an entire disk of information must be written to determine the track pitch to use to write the servo-pattern. This takes times and leads to increased manufacturing costs.

To overcome such problems, self-servo-writing timing generation processes have recently been developed. These processes allow accurately aligned servo-data tracks to be written sequentially at each servo data radius without using any mechanical, magnetic, or optical positioning systems. Further, the need for auxiliary clock heads to write a reference timing pattern on the disk is eliminated. While such self-servo-writing processes are sufficient when the servo-data tracks are to be written using overlapping read and write heads (i.e., where a track can be written and read without changing head position), disk drives with non-overlapping read and write elements are now being produced.

More specifically, as read and write element dimensions have been decreased to increase storage density, the widths over which reading and writing occur have decreased more rapidly than the distance between the read and write elements themselves. As a result, when using a head with such elements on a rotary actuator, the read element of the head can no longer overlap the area written by the write element of the head at all radial positions. When the known self-servo-writing processes are used for drives in which the read and write elements do not overlap, accurate circumferential alignment of the servo-data tracks cannot be maintained and there is a lack of stability against the growth of random errors in the pattern generation process.

SUMMARY OF THE INVENTION

In view of these drawbacks, it is an object of the present invention to remove the above-mentioned drawbacks and to provide a self-servo-writing process for use with non-overlapping read and write elements that produces servo-data tracks having accurate circumferential alignment.

Another object of the present invention is to provide a self-servo-writing process for use with non-overlapping read and write elements that has stability against the growth of random errors in the pattern generation process.

One embodiment of the present invention provides a method of writing a servo-pattern on a storage medium. According to the method, first timing marks are written at a first radial position of the storage medium, and the head is moved to a second radial position. Time intervals between selected pairs of the first timing marks are measured, and other timing marks are written at the second radial position of the storage medium. The measuring step is performed after the moving step. In a preferred method, the steps of moving, measuring, and writing other timing marks are repeated until the servo-pattern is written on an entire surface of the storage medium.

Another embodiment of the present invention provides a method for generating an initial aligned pattern of timing marks for self-servo-writing on a storage medium. According to the method, a first set of unaligned timing marks is written such that at some radial position of a read element more than one of the timing marks is detected. Relative locations of the unaligned timing marks are measured, and an aligned pattern is written by adjusting the time delay for writing based on the timing mark being read by the read element and a calculated position of that timing mark.

Other objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

DETAILED DESCRIPTION OF PREFERRED EMBODIMENTS

Preferred embodiments of the present invention will be described in detail hereinbelow with reference to the attached drawings.

A common servo architecture is "embedded servo" in which a clock propagation process is used to write servo pattern information on all disk surfaces of the disk drive. To write the servo pattern, a clock is needed to position the servo-data circumferentially. In self-propagation processes, only the normal data heads of the disk drive are used to generate the clock that is used to write the pattern. Because a single head cannot read and write simultaneously, each servo-track is divided into alternating sectors and timing is synchronized in one sector just prior to writing the next sector.

For example, in one exemplary self-propagation process, the head is moved to a first track and trigger patterns are written in odd numbered sectors. Then, after the head is moved a fraction of a data track width to the next servo-track, the previously-written odd numbered sectors are used to synchronize the writing of the trigger patterns in even numbered sectors. The head is then moved to the next servo-track and the even numbered sectors are used to synchronize the writing of the trigger patterns in the odd numbered sectors. This is repeated until trigger patterns are written across the entire recording surface of the disk.

Figure 2A:
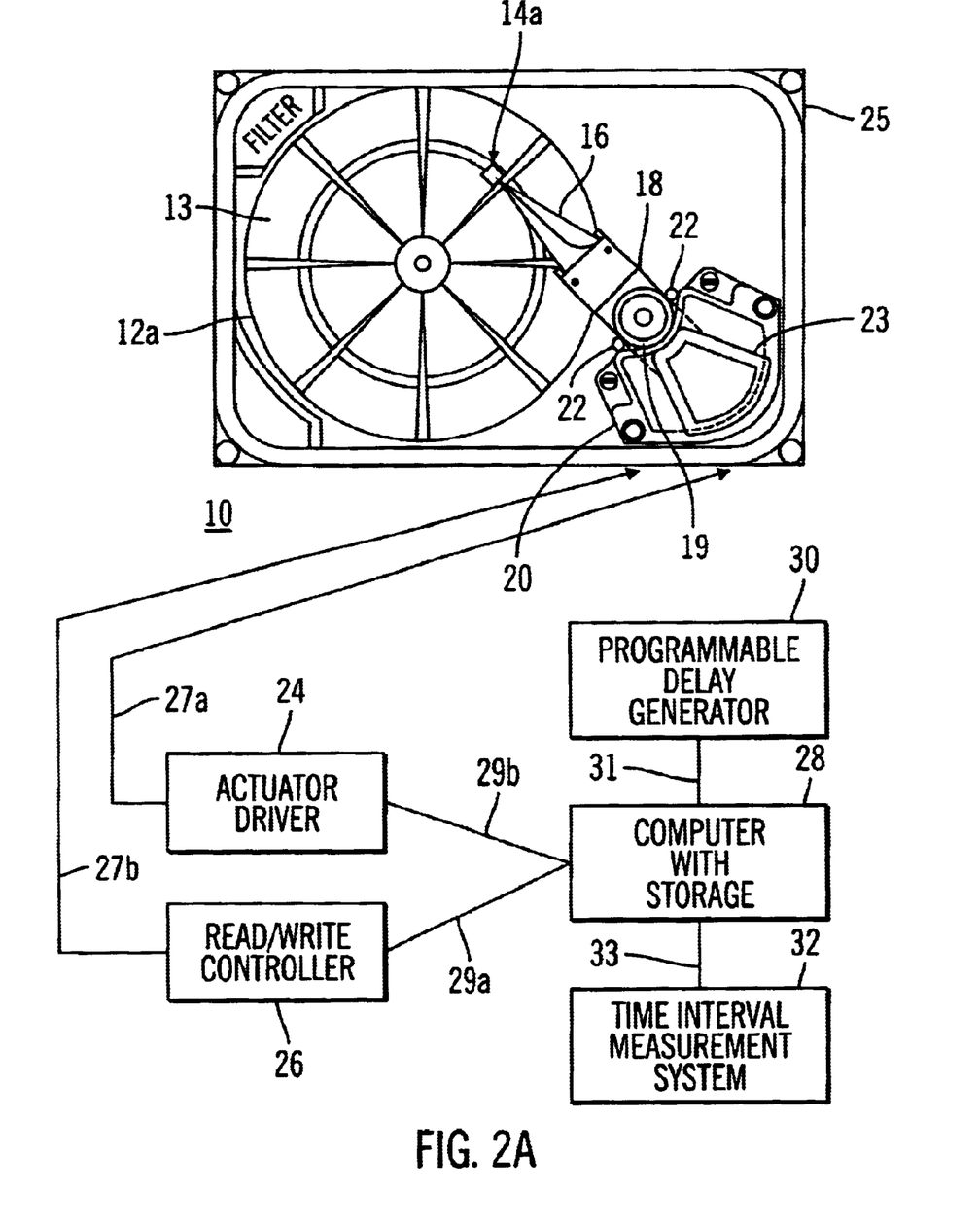
FIGS. 2(a) and 2(b) show a disk drive and associated control apparatus for use with the self-servo-writing processes of the present invention.
Figure 2B:
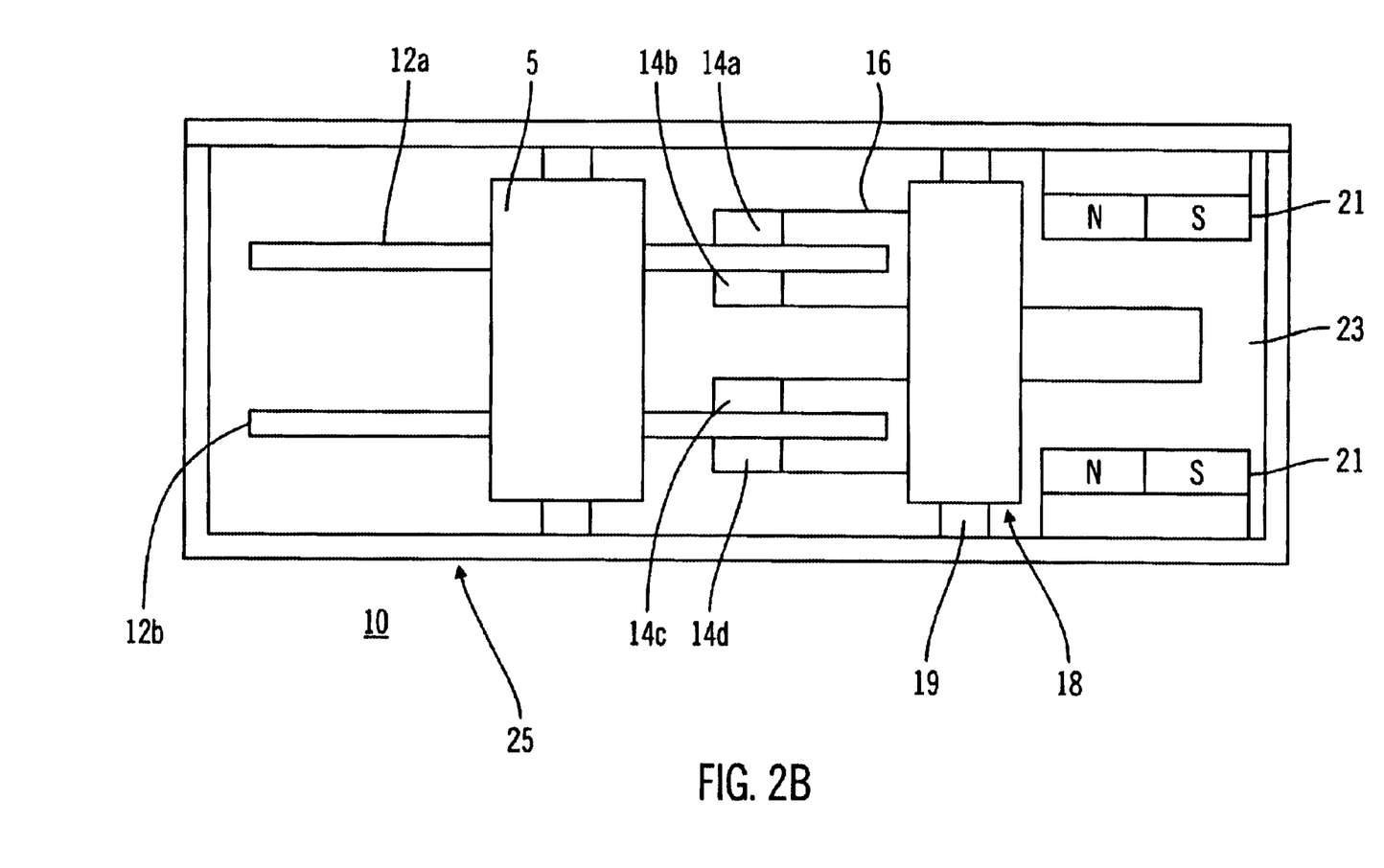

FIGS. 2(a) and 2(b) show an exemplary disk drive. The drive 10 includes magnetic disks 12, internal recording heads 14, head suspension mechanisms 16, an actuator 18, an actuator attachment 20, and crash stops 22. Also shown in FIG. 2(a) are an actuator driver 24, a read/write controller 26, a computer 28, a programmable delay generator 30, and a time interval measurement system 32. In the illustrated drive, each of the magnetic disks has two surfaces that can store information in circular tracks 13. The internal recording heads 14 are used to write information onto these surfaces, and a spindle motor 5 is used to spin the magnetic disks 12. Each recording head 14 is attached to a suspension mechanism 16 that allows the head to move in a vertical direction.

The actuator 18 (e.g., a standard moving coil actuator that includes a ball bearing 19) connects the suspension mechanism 16 to a voice coil motor 23 that has magnets 21. The crash stops 22 are provided on the sides of the ball bearing 19 to limit the range of the actuator 18, which is mounted to a base plate 25 via the actuator attachment 20. The actuator driver 24 is coupled to the drive via a wire 27a to provide current to the voice coil motor 23. Additionally, the read/write controller 26 is coupled to the drive via another wire 27b to read and write information (i.e., magnetic transitions) on the magnetic disks 12.

The computer is coupled to the actuator driver 24 and the read/write controller 26 via buses 29a and 29b, and to the programmable delay generator 30 (e.g., a Hewlett Packard HP8118A) and the time interval measurement system 32 (e.g., including a Hewlett Packard HP5372A time analyzer) via buses 31 and 33 (e.g., IEEE busses). The programmable delay generator 30 controls the write timing and the time interval measurement system 32 measures selected time intervals. The use of such hardware to write servo-data is further described in U.S. Pat. No. 5,615,058, which is herein incorporated by reference. While. FIGS. 2(a) and 2(b) show an exemplary disk drive and related hardware for use with embodiment of the present invention, other types of drives can also be used (e.g., drives having only one magnetic disk or only one recording head).

Figure 6:
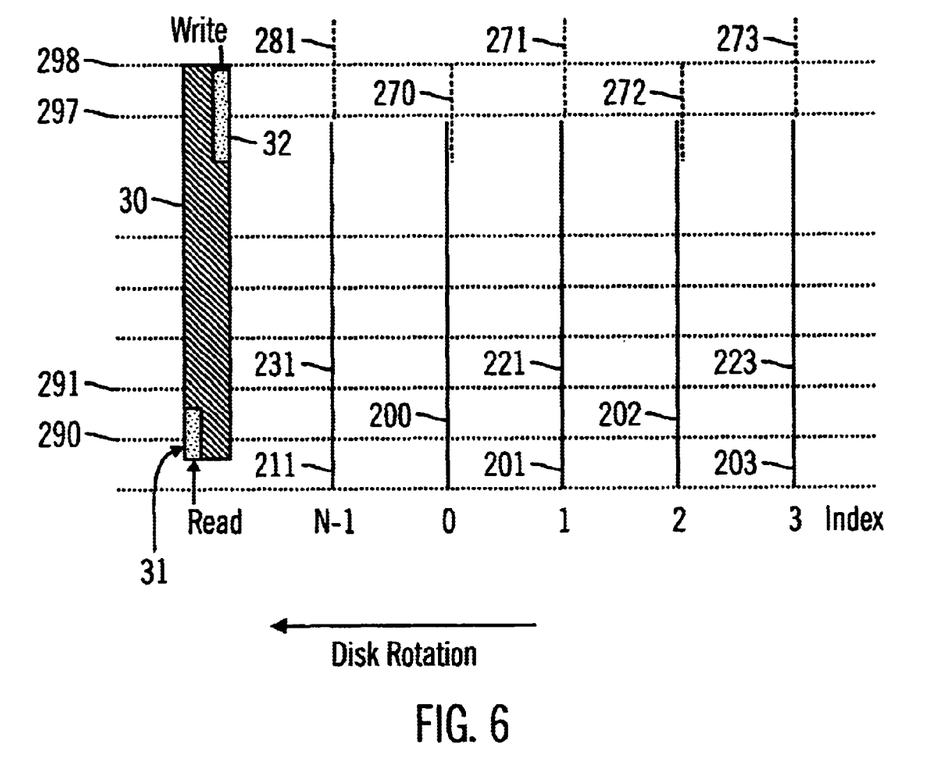
FIG. 6 illustrates a propagation procedure of the self-servo-writing process of the first embodiment.

As explained above, disk drives are now being manufactured with non-overlapping read and write elements. The self-propagation processes of the present invention provide timing control for writing servo-track information for such drives in which the radial position of the write element does not overlap the radial position of the read element for at least some radial position of the actuator arm. In other words, data written by the write element cannot be detected by the read element without changing the radial location of the head. The present invention is particularly suited for use with disk drives having "offset" heads (i.e., the read and write elements are physically separated in the radial direction). FIG. 6 shows an exemplary offset head 30 in which the recording or writing element 32 and the magnetic detection or read element 31 are physically separated in the radial (i.e., track-to-track) direction.

In embodiments of the present invention, when the head is positioned so that the write element writes servo-data at a given radial location, the read element passes over servo-data that was previously written at a different radial location. The servo-data is sequentially written at each radial position, so the read element must be displaced from the write element in a direction that is opposite to the direction of servo-track writing propagation. In preferred embodiments, the process is performed using timing marker generation and detection hardware such as that described above with reference to FIGS. 2(a) and 2(b).

A self-servo-writing process according to a first embodiment of the present invention will now be explained. The first embodiment includes a startup procedure for creating a radial region at least as wide as the offset between the read and write elements that has a radially continuous distribution of timing marks and/or servo-data, and a propagation procedure for writing additional timing marks and/or servo-data at each sequential radial location of the disk. In the startup procedure, the read-to-write delay is first measured to allow a correction to be made for the time difference between when a write command is given and when the read element detects the written data on a subsequent read (relative to the time reference point for the write command).

Figure 3:
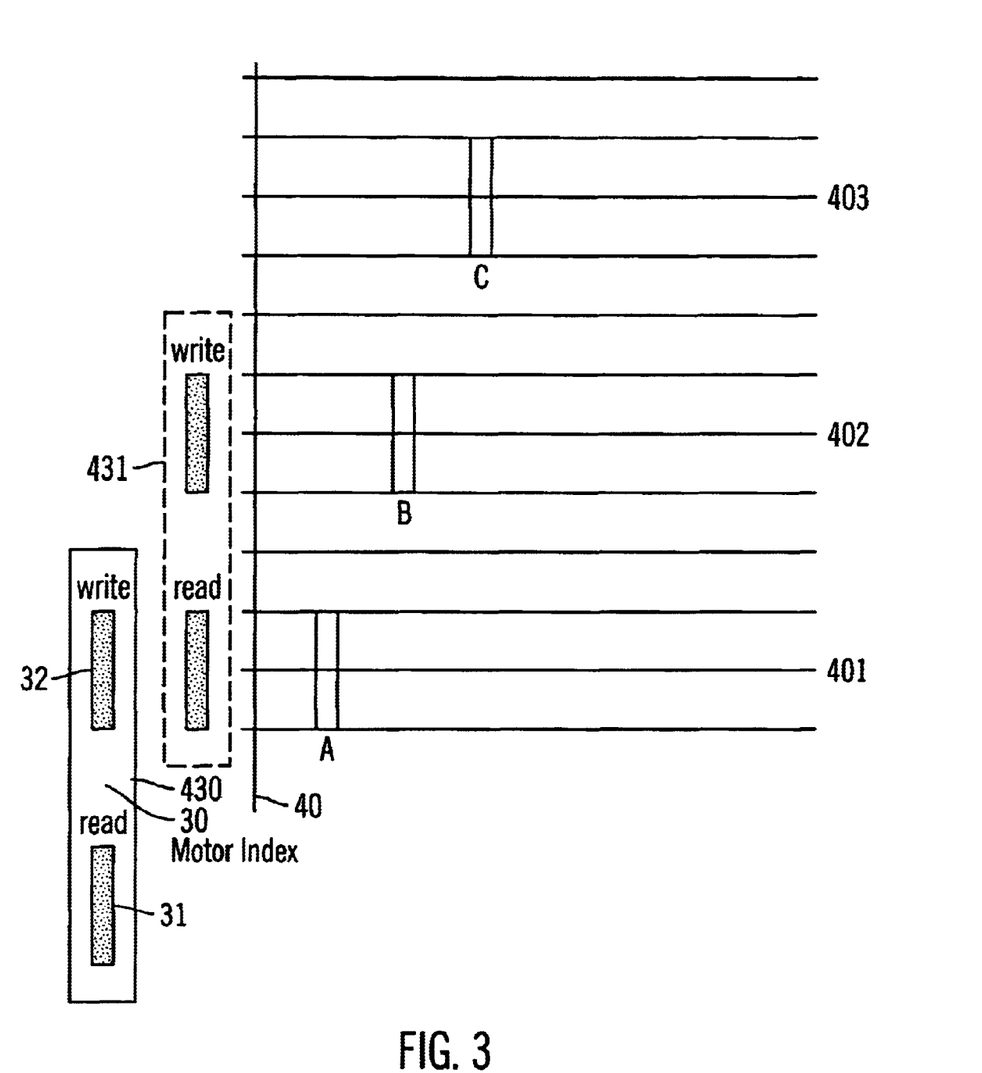
FIG. 3 illustrates a read-write delay measurement portion of a self-servo-writing process according to a first embodiment of the present invention.
Figure 5:
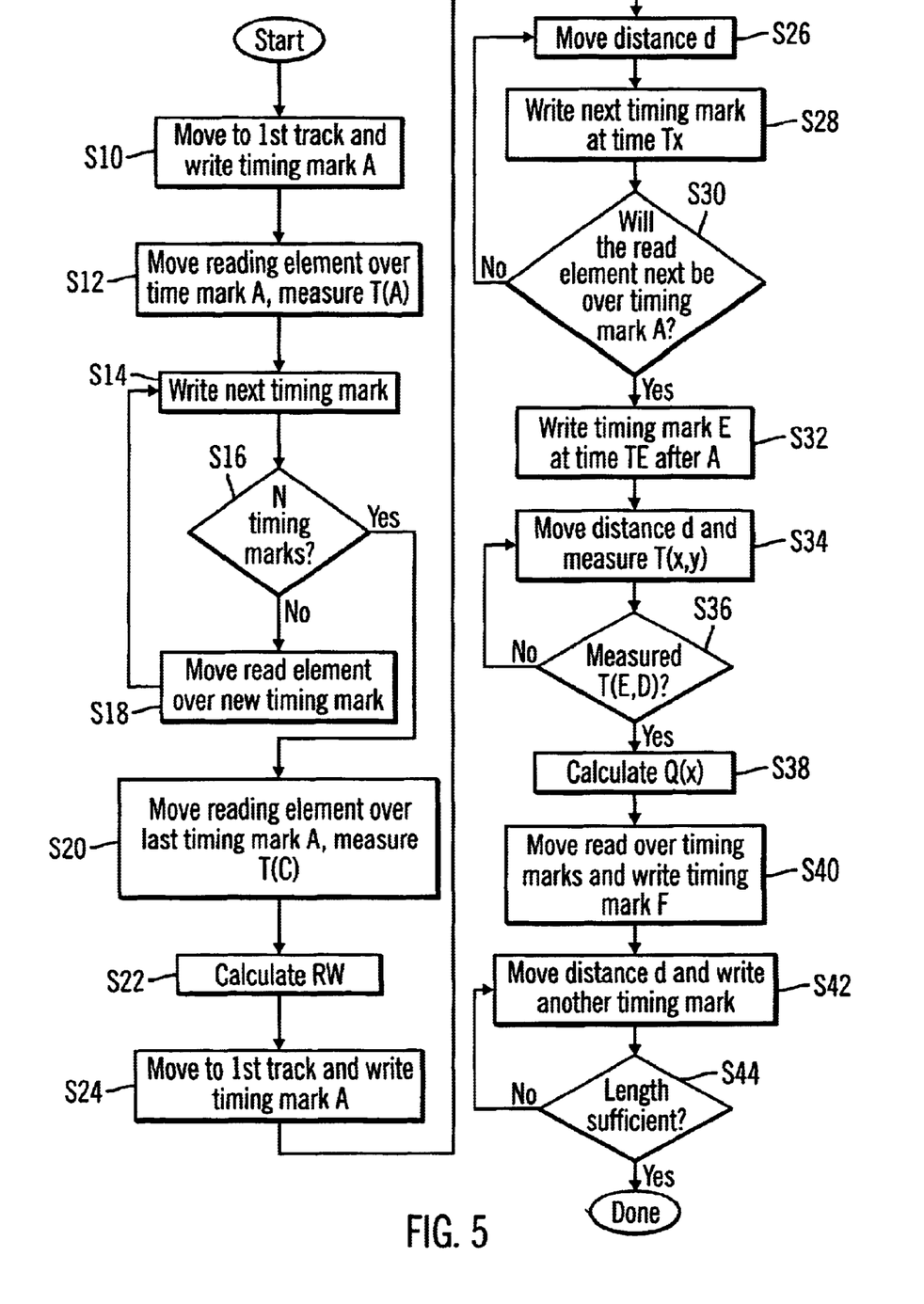
FIG. 5 shows a flow chart of the startup procedure of the self-servo-writing process of the first embodiment.

FIG. 3 illustrates the read-write delay measurement portion of the first embodiment and FIG. 5 shows a flow chart for the startup procedure of the first embodiment. First, the head 30 is moved to starting position 430 so that the write element 32 is over servo-track 401, and a write command is given on the motor index 40 to write a first timing mark A (step S10). Then, the head 30 is moved to position 431 so that the read element 31 passes over servo-track 401 and timing mark A, and the time difference T(A) between the passage of the motor index 40 and of the reading of timing mark A is measured (step S12). In preferred embodiments, this measurement is repeated and averaged to get a more accurate value for time difference T(A).

After finding time difference T(A), a write command is given to write another timing mark B at a predetermined time T0 after timing mark A is detected by the read element and detection circuits (step S14). The movement and writing are then repeated to sequentially write additional timing marks each at time T0 after the previous mark until N timing marks have been written. More specifically, if N timing marks have not been written (step S16), the head 30 is moved so that the read element 31 passes over the previously-written timing mark (e.g., B) and another timing mark (C) is written at time T0 after the previous mark (steps S18 and S14).

After N timing marks have been written (step S16), the head 30 is moved so that the read element passes over the last timing mark. While in the illustrated embodiment N is 3 and the last mark is timing mark C on servo-track 403, N can take any value greater than 1 and typically will be much higher than 3. Next, the time difference T(C) between the passage of the motor index 40 and last timing mark C is measured (step S20). In preferred embodiments, this measurement is also repeated and averaged to get a more accurate value for time difference T(C). Then, the read-write delay RW is calculated using the following equation (step S22).

$$RW=[(T(C)-T(A))(N-1)]-T0$$

The read-write delay RW is used to properly time the writing of the timing pattern. In particular, whenever trigger mark X is to be written a time T after trigger mark Y is detected, the write command for writing trigger mark X is issued at time T-RW to make the actual time between the circumferential locations of trigger marks X and Y equal to T. Thus, in the following description of the pattern writing process, all write commands are impliedly issued a time RW before the stated times so that the desired location for writing a timing mark and the time that the timing mark is detected by the read head are the same. Further, in preferred embodiments, the timing marks are written at multiple locations around the disk. In the following description, each step of the pattern writing process is impliedly executed at all equivalent locations around the disk circumference. Thus, if the description states that timing mark B is written a time after timing mark A, this is being carried out at multiple locations around the servo-track.

Figure 4:
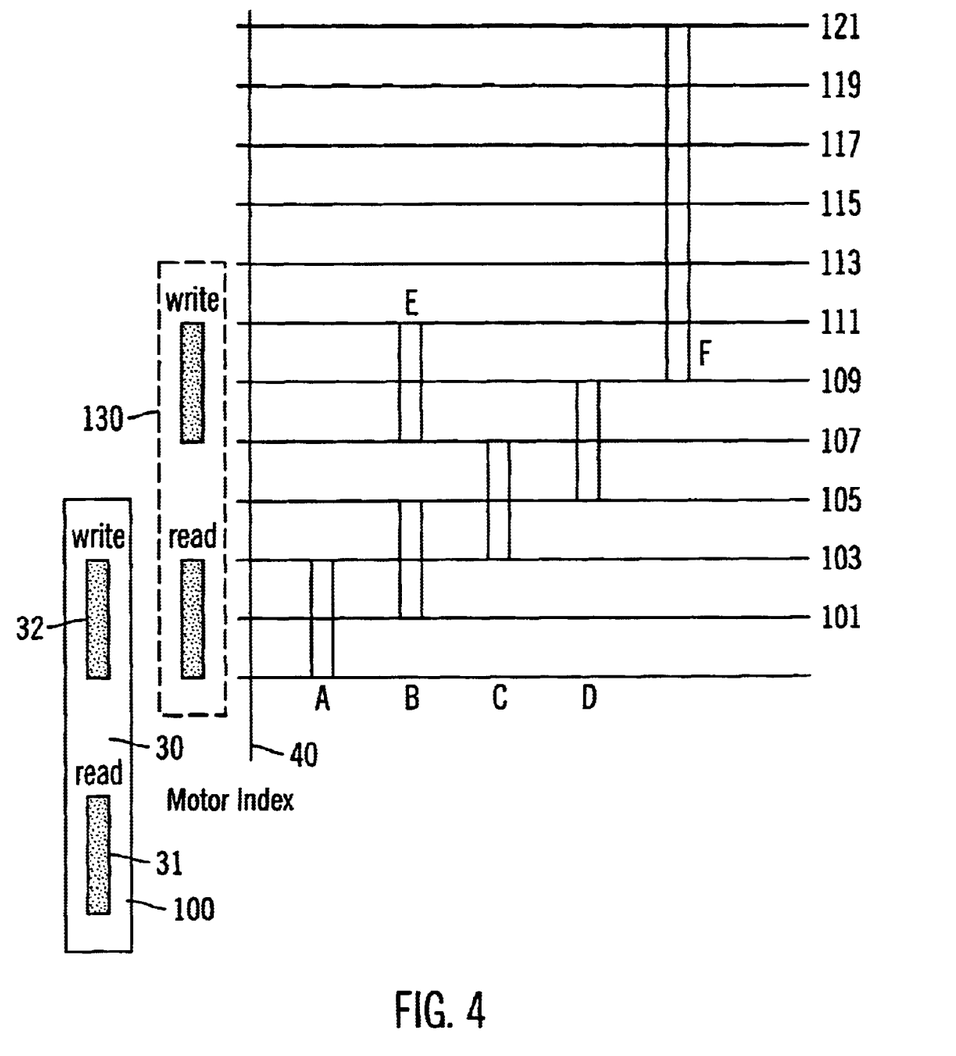
FIG. 4 illustrates an initial pattern propagation portion of the first embodiment.

FIG. 4 illustrates the initial pattern propagation portion of the first embodiment. First, the head 30 is moved to starting position 100 so that the write element is over servo-track 101, and first timing mark A is written at a time T0 after the motor index 40 (step S24). (As explained above, additional timing marks are written around the servo-track at uniform intervals that are preferably multiples of the sector length.) Then, the head 40 is moved a distance d that is less than the head width to be over servo-track 103 (step S26), and another timing mark B is written at a second time TB after the motor index 40 (and at uniform intervals around the servo-track) (step S28). In the illustrated embodiment, d is one half the width of a servo-track and TB=2(T0).

This is repeated at different times Tx after the motor index 40 until the head 30 is at position 130 with the read element 31 passing over servo-track 101 so as to cross timing mark A (steps S26, S28, and S32). At this position, another timing mark E is written at a time TE after timing mark A (and at the same interval after the other timing marks A on servo-track 101(step S32). The head is then moved distance d so that the read element passes over servo-track 103 so as to cross timing marks A and B, and the time T(B, A), which is the time of passage of timing mark A subtracted from the time of passage of timing mark B, is measured (at all locations around the disk) (step S34). (Timing marks such as A and B are said to be "overlapping timing marks" because both marks can be detected at one radial location of the read element.) This is repeated to measure the times such as T(C, B) and T(D, C) between all successive marks until the time difference T(E, D) between the last of the written timing marks has been measured (steps S34 and S36). In alternative embodiments, the time differences between an external rotational reference (e.g., the motor index) and one or more timing marks is measured. (Note that a time difference can have a positive or negative value depending on the chosen sequence of timing marks.) Then, a correction term Q(x) is calculated using the following equation (step S38).

$$Q(x)=K \times (S(E, A)-TE)/M$$

where K is the number of radial locations between timing marks x and A, M is the number of radial locations between timing marks A and E. Further, S(x, A) is the sum of the time differences between timing marks x and A. For example, S(D, A)=T(B, A)+T(C, B)+T(D, C). Thus, in the illustrated embodiment in which M is 4, Q(D) is given by the following equation.

$$Q(D)=3 \times (S(E, A)-TE)/4$$

Timing mark E is used in calculating the correction term because the location of timing mark E relative to timing mark A is precisely known. More specifically, because timing mark E was written by triggering off of timing mark A and the read-write delay has been determined, the location of timing mark E relative to timing mark A is precisely known. Thus, the correction term is defined such that it is zero at each end of the sequence (i.e., Q(A)=Q(E)=0). Because the location of each end of the sequence is known, discontinuities in alignment are eliminated because subsequent timing marks are written by triggering off of the sequence A to E.

Next, the head 30 is again positioned so that the read element 31 passes over servo-track 103, and another timing mark F is written at a time TF-Q(A) after timing mark A (step S40). Thus, timing mark F is correctly physically located at time TF after the timing mark A. Next, the head 30 is moved distance d and another timing mark is written at the same time TF after timing mark A (step S42). In particular, the read element crosses timing mark B and the new timing mark is written at a time TF-S(B, A)-Q(B) after timing mark B. This is repeated at new head positions using consecutive timing marks and the corresponding sums and correction terms, such as S(B, C) and Q(C), and S(B, D) and Q(D), until a continuous and substantially straight line with a radial extent exceeding the distance between the read and write elements has been written at location F (steps S42 and S44). At this point, the startup procedure is complete and the propagation procedure can be used to extend the timing marks and complete the servo-data pattern.

While in the above-described embodiment, timing marks A through F are written around the servo-track in each sector, in a further embodiment, the different timing marks are written in different sectors. In particular, timing marks A through D are written in four subsequent sectors, then timing mark E is written in the second sector with timing mark B. Timing mark F is written in the sector after timing mark D (i.e., a fifth sector), and preferably two additional timing marks identical to timing mark F are written in the subsequent two sectors (i.e., sixth and seventh sectors). Thus, in this embodiment, one set of timing marks A through F occupies seven sectors, which can then repeat around the servo-track. Generally, after a previously-written timing mark is detected, subsequent timing marks are written at a constant time interval until the next previously-written timing mark is detected.

Figure 7:
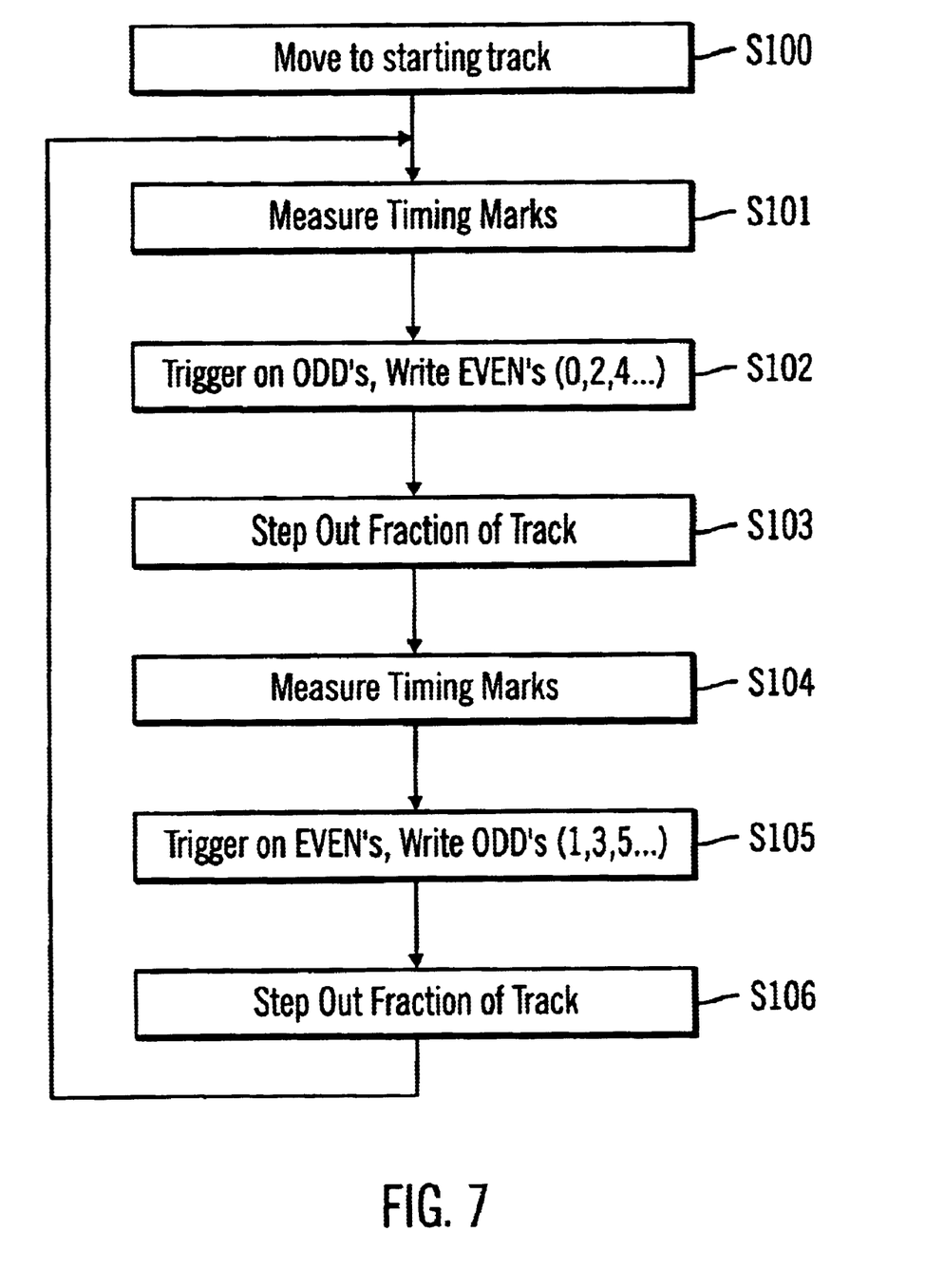
FIG. 7 shows a flow chart of the propagation procedure of the first embodiment.

FIG. 6 illustrates and FIG. 7 shows a flow chart for the propagation procedure of the first embodiment. In the propagation procedure, additional timing marks and servo-data are recorded at each sequential radial location as described below. In FIG. 6, timing marks that were written during the startup procedure are shown as solid lines, and timing marks written during the propagation procedure are shown as dashed lines, with timing mark locations being indexed as 0, 1, 2, . . . N−1.

First, the head 30 is positioned so that the write element 32 is over servo-track 297 in order to write the next set of timing marks and servo-data (step S100). Thus, as shown in FIG. 6, the read element 31 passes over servo-track 290 and crosses timing marks 211, 200, 201, 202 . . . and the write element 32 passes over servo-track 297 as the disk rotates. As the disk rotates, the times when the motor index and each timing mark such as 211 and 200 pass under the read element are recorded (step S101). The time differences between successive timing marks are the time intervals, and a set of delay times is calculated from the time intervals and the time between the motor index and the first timing mark using formulas such as those described in U.S. patent application Ser. No. 08/882,396, U.S. patent application Ser. No. 08/891,122, and U.S. patent application Ser. No. 08/891,282, all of which were filed on Jul. 10, 1997 and are herein incorporated by reference.

Then, the even-indexed timing marks such as 0 and 2 are written at the calculated delays after the preceding odd-indexed timing marks are passed. For example, new timing mark 270 is written at a delay T0 after timing mark 211 is passed. This continues until all of the even-indexed timing marks of the servo-track are written (step S102). The head is then moved to position the write element over the next servo-track 298 in order to write the next set of timing marks and servo-data (step S103). Thus, as shown in FIG. 7, the read element 31 passes over servo-track 291 and crosses timing marks 231, 200, 221, 202 . . . and the write element 32 passes over servo-track 298 as the disk rotates.

Next, the intervals between the timing marks are measured at the new head position and a new set of delay times is calculated in the manner described above (step S104). The odd-indexed timing marks such as 1 and 3 are then written at the calculated delays after the preceding even-indexed timing marks are passed. For example, new timing mark 271 is written at a delay T1 after timing mark 200 is passed. This continues until all of the odd-indexed timing marks of the servo-track are written (step S105). The head is then moved to position the write element over the next servo track in order to write another set of timing marks and servo-data (step S106), and the entire writing process is repeated until timing marks extend across the entire disk surface to complete the servo-pattern (steps S801–S106).

The aligned pattern of timing marks being written can be used as a clock to write the servo-data itself during the same or subsequent revolutions of the disk (i.e., concurrent with or after the above described process for propagating the timing marks), as explained in the U.S. Patents and Patent Applications mentioned above.

Figure 8:
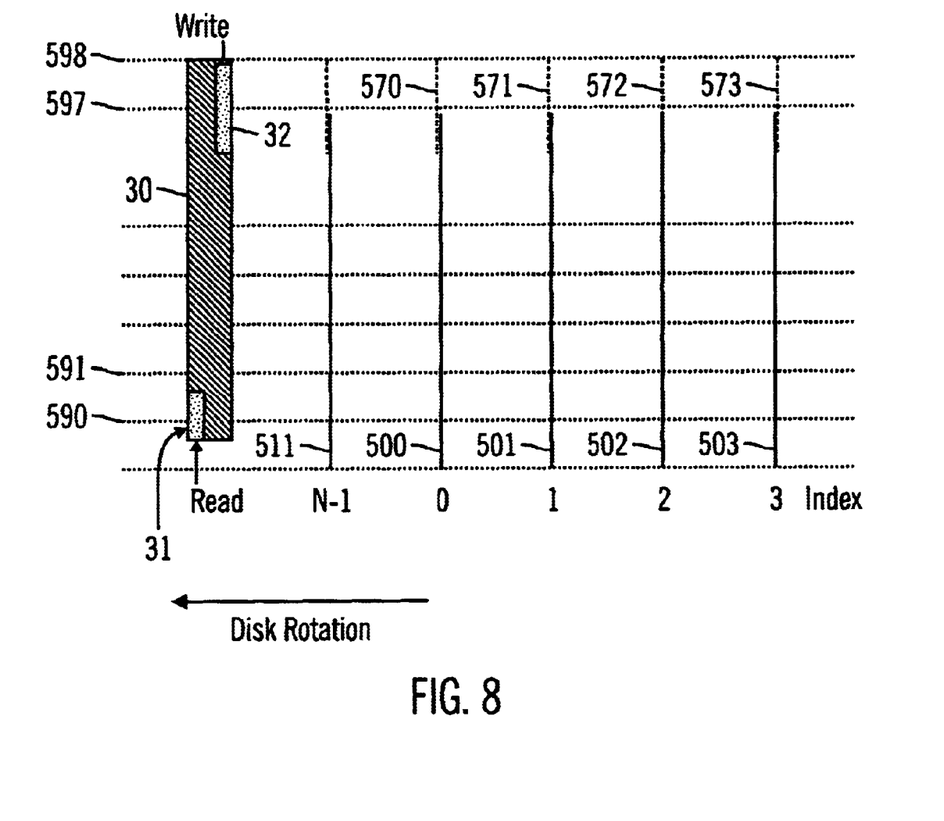
FIG. 8 illustrates a propagation procedure of a self-servo-writing process according to a second embodiment of the present invention.
Figure 9:
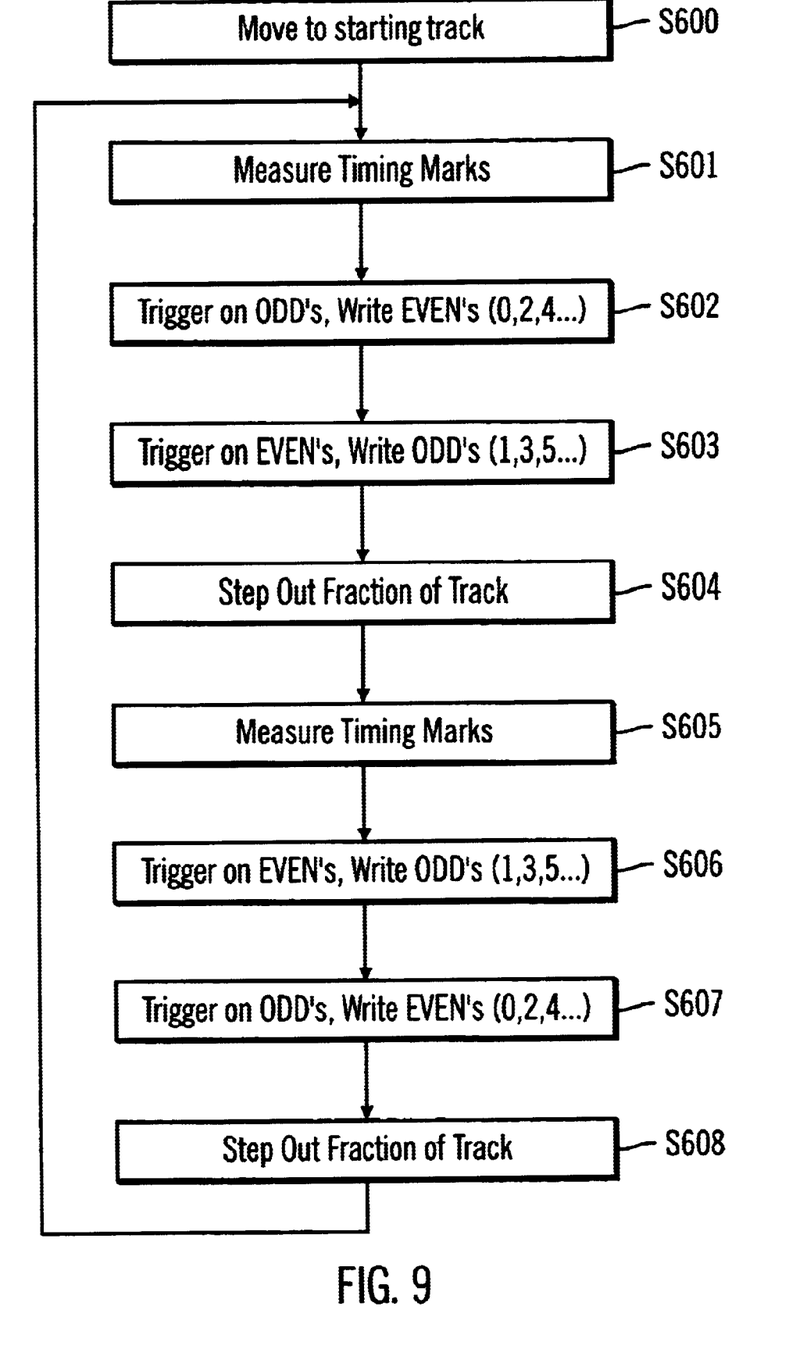
FIG. 9 shows a flow chart of the propagation procedure of the second embodiment.

A self-servo-writing process according to a second embodiment of the present invention will now be explained. The second embodiment uses the same startup procedure as the first embodiment, but uses a different propagation procedure to write additional timing marks and/or servo-data at each sequential radial location of the disk. FIG. 8 illustrates and FIG. 9 shows a flow chart for the propagation procedure of the second embodiment. In FIG. 8, the timing marks written during the startup procedure and those written during the propagation procedure are respectively shown as solid lines and dashed lines, and timing mark locations are indexed as 0, 1, 2, . . . N−1.

First, the head 30 is positioned so that the write element 32 is over servo-track 597 in order to write the next set of timing marks and servo-data (step S600). Thus, as shown in FIG. 8, the read element 31 passes over servo-track 590 and crosses timing marks 511, 500, 501, 502 . . . and the write element 32 passes over servo-track 597 as the disk rotates. As the disk rotates, the times when the motor index and each timing mark such as 511 and 500 pass under the read element are recorded (step S601). The time differences between successive timing marks are the time intervals, and a set of delay times is calculated from the time intervals and the time between the motor index and the first timing mark using predetermined formulas, as explained above.

Then, the even-indexed timing marks such as 0 and 2 are written at the calculated delays after the preceding odd-indexed timing marks are passed. For example, new timing mark 570 is written at a delay T0 after timing mark 511 is passed. This continues until all of the even-indexed timing marks of the servo-track are written (step S602). Then, the odd-indexed timing marks such as 1 and 3 are written at the calculated delays after the preceding even-indexed timing marks are passed. For example, new timing mark 571 is written at a delay Ti after timing mark 500 is passed. This continues until all of the odd-indexed timing marks of the servo-track are written (step S603). In the preferred embodiment, the even-indexed timing marks are written during one disk revolution and the odd-indexed timing marks are written during the next disk revolution.

Next, the head is moved to position the write element over the next servo-track 598 in order to write the next set of timing marks and servo-data (step S604). Thus, as shown in FIG. 8, the read element 31 passes over servo-track 591 and the write element 32 passes over servo-track 598 as the disk rotates. Next, the intervals between the timing marks are measured at the new head position and a new set of delay times is calculated in the manner described above (step S605). The odd-indexed timing marks are then written at the calculated delays after the preceding even-indexed timing marks are passed, and this continues until all of the odd-indexed timing marks of the servo-track are written (step S606).

Next, the even-indexed timing marks are written at the calculated delays after the preceding odd-indexed timing marks are passed, and this continues until all of the even-indexed timing marks of the servo-track are written (step S607). While in further embodiments the order of writing the even-indexed and odd-indexed timing marks is the same for each servo-track, the order is alternated in the preferred embodiment to make the process more symmetrical. Next, the head is moved to position the write element over the next servo track (step S608), and the entire writing process is repeated until timing marks extend across the entire disk surface to complete the servo-pattern (steps S601–S608).

The self-servo-writing process of the present invention can be implemented in hardware, software, or a combination of the two. For example, at least a portion of the process can be directed through software programs that are stored on a computer-readable medium (e.g., magnetic disk, optical disk, or non-volatile memory) for execution by a general purpose computer or special purpose microcontroller. Additionally, the self-servo-writing process of the present invention can be used with different type of drives and different types of heads than those described above.

Design choices, such as the number of timing marks written during the startup procedure, the number of timing marks written on each servo-track, the spacing of the servo-tracks, and the formulas used to find process variables could also easily be adapted. Further, while the embodiments described above describe specific steps that are performed in a specific order, further embodiments of the present invention may include additional steps and/or not include all of the steps recited above. For example, some embodiments of the present invention do not include the steps of writing timing mark E and/or measuring the read-to-write delay (e.g., detection times after motor index could be averaged to set the time delay for writing). Similarly, the order of the steps could be altered by one of ordinary skill in the art, and some embodiments of the present invention may not include all of the features described above.

While there has been illustrated and described what are presently considered to be the preferred embodiments of the present invention, it will be understood by those skilled in the art that various other modifications may be made, and equivalents may be substituted, without departing from the true scope of the invention. Additionally, many modifications may be made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method of writing a servo-pattern on a storage medium, said method comprising the steps of:
    writing a first plurality of timing marks at a first radial position of the storage medium using a head;
    moving the head to a second radial position;
    measuring time intervals between selected pairs of the timing marks; and
    writing another plurality of timing marks at the second radial position of the storage medium using the head, wherein the measuring step is performed after the moving step and before the step of writing another plurality of timing marks.

2. The method as defined in claim 1, further comprising the step of:
    calculating delay times from the measured time intervals, wherein in the step of writing another plurality of timing marks, the other timing marks are written using the calculated delay times.

3. The method as defined in claim 2, further comprising the step of repeating the steps of moving, measuring, calculating, and writing another plurality of timing marks, in that order, until the servo-pattern is written on an entire surface of the storage medium.

4. The method as defined in claim 1, further comprising the step of repeating the steps of moving, measuring, and writing another plurality of timing marks, in that order, until the servo-pattern is written on an entire surface of the storage medium.

5. A method of writing a servo-pattern on a storage medium, said method comprising the steps of:
   writing a first plurality of timing marks at a first- radial position of the storage medium using a head;
   moving the head to a second radial position;
   measuring time intervals between selected pairs of the timing marks; and
   writing another plurality of timing marks at the second radial position of the storage medium using the head,
   wherein the measuring step is performed after the moving step, and
   the head is an offset head having read and write elements that are physically separated in the radial direction so that the read and write elements are non-overlapping.

6. A method of writing a servo-pattern on a storage medium using an offset head having read and write elements that are physically separated in the radial direction so that the read and write elements are non-overlapping, said method comprising the steps of:
   moving the head to a starting radial position;
   using the read element to measure time intervals between selected pairs of timing marks that were previously written on a first servo-track of the storage medium;
   writing a plurality of timing marks at first locations around a second servo-track of the storage medium using the write element;
   moving the head to a new radial position;
   using the read element to measure time intervals between selected pairs of timing marks that were previously written on a third servo-track of the storage medium;
   writing a plurality of timing marks at second locations around a fourth servo-track of the storage medium using the write element;
   wherein the first measuring step is performed after the first moving step and before the first writing step,
   the second measuring step is performed after the second moving step and before the second writing step, and
   the first and second locations are interleaved.

7. The method as defined in claim 6, further comprising the step of:
   wherein in the measuring steps, delay times are calculated from the measured time intervals, and
   in the writing steps, the timing marks are written using the calculated delay times.

8. The method as defined in claim 6, wherein the steps are performed in the written sequential order.

9. The method as defined in claim 6, further comprising the steps of:
   writing a plurality of timing marks at second locations around the second servo-track of the storage medium using the write element; and
   writing a plurality of timing marks at first locations around a fourth servo-track of the storage medium using the write element.

10. The method as defined in claim 6, further comprising the step of repeating the steps of moving, measuring, and writing, in that order, until the servo-pattern is written on an entire surface of the storage medium.

11. The method as defined in claim 6, further comprising the step of writing an initial aligned pattern of timing marks on the storage medium during a startup procedure.

12. An apparatus for writing a servo-pattern on a storage medium of a drive having a head, said apparatus comprising:
   means for controlling the head to write a first plurality of timing marks at a first radial position of the storage medium;
   means for moving the head to a second radial position;
   means for measuring time intervals between selected pairs of the timing marks;
   second means for controlling the head to write another plurality of timing marks at the second radial position of the storage medium and
   control means for controlling the other means such that the means for measuring operates after the means for moving and before the second means for controlling the head to write another plurality of timing marks.

13. The apparatus as defined in claim 12,
   wherein the Means for measuring also calculates delay times from the measured time intervals, and
   the second means for controlling writes the other timing marks using the calculated delay times.

14. The apparatus as defined in claim 12, wherein the control means also repeatedly operates the means for moving, means for measuring, and second means for controlling, in that order, until the servo-pattern is written on an entire surface of the storage medium.

15. An apparatus for writing a servo-pattern on a storage medium of a drive having a head, said apparatus comprising:
   means for controlling the head to write a first plurality of timing marks at a first radial position of the storage medium;
   means for moving the head to a second radial position;
   means for measuring time intervals between selected pairs of the timing marks;
   second means for controlling the head to write another plurality of timing marks at the second radial position of the storage medium; and
   control means for controlling the other means such that means for measuring operates after the means for moving,
   wherein the head is an offset head having read and write elements that are physically separated in the radial direction so that the read and write elements are non-overlapping.

16. A method for generating an initial aligned pattern of timing marks for self-servo-writing on a storage medium, said method comprising the steps of:
   writing a first set of unaligned timing marks at successive radial positions using a write element such that at least two of the timing marks are detected for at least one radial position of a read element;
   measuring time differences between a time reference and at least two of the timing marks;
   calculating at least one correction factor based on the time differences; and
   writing an aligned pattern using the write element by adjusting the time delay for writing based on the timing mark being read by the read element and the correction factor,
   wherein the read and write elements are physically separated in the radial direction so that the read and write elements are non-overlapping.

17. The method as defined in claim 16, wherein in the measuring and calculating steps, time differences between successive ones of the timing marks are measured and summed in calculating the correction factor.

18. The method as defined in claim 17, further comprising the step of:

measuring positions of the two ends of the first set of unaligned timing marks, wherein in the step of writing an aligned pattern, the time delay for writing is also adjusted based on the measured positions.

19. The method as defined in claim 18, wherein the step of measuring positions includes the sub-step of averaging detection times after motor index.

20. The method as defined in claim 18, further comprising the step of writing at least one additional timing mark while the read element is positioned over the first set of unaligned timing marks at a fixed delay after one of the timing marks of the first set.

21. The method as defined in claim 16, wherein the time reference is another timing mark.

22. The method as defined in claim 16, wherein the time reference is a rotational reference that is external to the storage medium.

23. A method for calculating read-to-write delay for a storage medium, said method comprising the steps of:

writing a first timing mark using a write element;

writing at least one additional timing mark using the write element at a fixed time delay after the first timing mark;

calculating locations of the first timing mark and a last of the timing marks; and calculating the read-to-write delay using the difference between the locations of the timing marks and the fixed time delay, wherein the timing marks are written and read using a head having non-overlapping read and write elements.

24. The method as defined in claim 23, further comprising the step of writing an aligned pattern by adjusting the time delay for writing based on the read-to-write delay.

25. The method as defined in claim 23, further comprising the step of writing at least one additional timing mark while the read element is positioned over one of the previously-written timing marks.

26. The method as defined in claim 23, wherein in the step of calculating the read-to-write delay, the read-to-write delay is calculated according to the equation:

$$RW = [(T(N) - T(A))/(N-1)] - T0.$$

27. The method as defined in claim 23, wherein the timing marks are written at successive radial positions such that at least two of the timing marks are detected for at least one radial position of a read element.

* * * * *

UNITED STATES PATENT AND TRADEMARK OFFICE
CERTIFICATE OF CORRECTION

PATENT NO. : 6,633,451 B1
DATED : October 14, 2003
INVENTOR(S) : Timothy J. Chainer et al.

It is certified that error appears in the above-identified patent and that said Letters Patent is hereby corrected as shown below:

Column 10,
Line 60, change from "wherein in" to -- wherein --

Column 11,
Line 46, change from "wherein in" to -- wherein --

Column 12,
Line 17, change from "Means" to -- means --
Line 62, change from "wherein in" to -- wherein --

Column 13,
Line 5, change from "wherein in" to -- wherein --

Column 14,
Line 15, change from "wherein in" to -- wherein --

Signed and Sealed this

Thirtieth Day of December, 2003

JAMES E. ROGAN
*Director of the United States Patent and Trademark Office*